United States Patent
Akita et al.

(10) Patent No.: US 8,376,619 B2
(45) Date of Patent: Feb. 19, 2013

(54) GREASE FOR SLIDE BEARING

(75) Inventors: Hideki Akita, Tsuchiura (JP); Osamu Gokita, Kasumigaura (JP); Minoru Fujisaki, Chiba-ken (JP); Hajime Maezawa, Kasumigaura (JP); Nobuo Yanaka, Nerima-ku (JP); Hiroshi Nishimura, Yokohama (JP); Hideyuki Fujiya, Ota-ku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/346,223

(22) Filed: Jan. 9, 2012

(65) Prior Publication Data
US 2012/0106881 A1 May 3, 2012

Related U.S. Application Data

(63) Continuation of application No. 13/041,993, filed on Mar. 7, 2011, now abandoned, which is a continuation of application No. 11/587,487, filed as application No. PCT/JP2005/019623 on Oct. 25, 2005, now abandoned.

(30) Foreign Application Priority Data

Oct. 29, 2004 (JP) .................. 2004-316745
Oct. 29, 2004 (JP) .................. 2004-316755

(51) Int. Cl.
*F16C 33/02* (2006.01)
*F16C 25/02* (2006.01)
*F16C 17/00* (2006.01)

(52) U.S. Cl. ......... 384/279; 384/311; 384/322; 384/129

(58) Field of Classification Search .......... 384/147, 384/220, 222, 279, 371, 470, 129, 311, 322; 508/155, 465, 485, 539
See application file for complete search history.

(56) References Cited

U.S. PATENT DOCUMENTS

| | | | | |
|---|---|---|---|---|
| 3,424,503 | A | * | 1/1969 | Schulz ........................ 384/222 |
| 4,093,323 | A | * | 6/1978 | Quandt et al. ................ 384/220 |
| 4,981,602 | A | * | 1/1991 | Ripple et al. ................. 508/239 |
| 5,490,730 | A | * | 2/1996 | Akita et al. .................. 384/279 |
| RE36,405 | E | * | 11/1999 | Akita et al. .................. 384/147 |
| 6,023,114 | A | | 2/2000 | Mori et al. |
| 6,048,826 | A | | 4/2000 | Ikeda et al. |
| 6,352,961 | B1 | | 3/2002 | Iso et al. |
| 6,417,143 | B1 | * | 7/2002 | Mikami et al. ............... 508/465 |
| 7,014,367 | B2 | | 3/2006 | Miyasaka et al. |
| 2003/0158052 | A1 | | 8/2003 | Akiyama |
| 2005/0163408 | A1 | | 7/2005 | Wakabayashi et al. |

FOREIGN PATENT DOCUMENTS

| | | | |
|---|---|---|---|
| DE | 3827741 A1 | * | 6/1989 |
| EP | 0 926 367 A1 | | 6/1999 |
| EP | 926367 A1 | * | 6/1999 |
| JP | 60-044620 | | 3/1985 |
| JP | 61052414 | | 3/1986 |
| JP | 63-195416 | | 8/1988 |
| JP | 63-60247 | | 11/1988 |

(Continued)

*Primary Examiner* — Marcus Charles
(74) *Attorney, Agent, or Firm* — Mattingly & Malur, P.C.

(57) ABSTRACT

Grease for a slide bearing, which can suppress unusual noise attributable to a slip caused between a shaft and a bearing when a machine is stopped. In slide bearing grease 24 supplied to between a slide bearing 16 formed of a porous sintered alloy-made bushing having pores 30 impregnated with lubricating oil 31 and a shaft 22 inserted in the slide bearing 16 and supported to be slidingly rotatable in the circumferential direction, the slide bearing grease 24 employs base oil having dynamic viscosity of 10-70 mm$^2$/s at 40° C. and exuding under a load of the shaft 22 to form an oil film 35 between the slide bearing 16 and the shaft 22.

10 Claims, 8 Drawing Sheets

FOREIGN PATENT DOCUMENTS

| | | | |
|---|---|---|---|
| JP | 03233188 A | * | 10/1991 |
| JP | 08-105444 | | 4/1996 |
| JP | 08105444 A | * | 4/1996 |
| JP | 09-14269 | | 4/1997 |
| JP | 09177803 A | * | 7/1997 |
| JP | 10-082423 | | 3/1998 |
| JP | 10082423 A | * | 3/1998 |
| JP | 11-336761 | | 12/1999 |
| JP | 2004181396 | | 7/2004 |
| JP | 2005069365 A | * | 3/2005 |
| JP | 2005090620 A | * | 4/2005 |
| JP | 2007239838 A | * | 9/2007 |
| WO | WO 9901675 A1 | * | 1/1999 |
| WO | 03/064873 A1 | | 1/2003 |

* cited by examiner

FIG. 7

| | SAMPLE 1 | SAMPLE 2 | SAMPLE 3 | SAMPLE 4 | SAMPLE 5 | COMMERCIALLY SOLD GREASE 1 | COMMERCIALLY SOLD GREASE 2 | COMMERCIALLY SOLD GREASE 3 |
|---|---|---|---|---|---|---|---|---|
| THICKENER | Li | Li | Li | Li | Li | Li | Li | SPECIAL Ca |
| BASE OIL | MINERAL OIL | MINERAL OIL | MINERAL OIL | MINERAL OIL | MINERAL OIL | MINERAL OIL | MINERAL OIL | MINERAL OIL |
| VISCOSITY OF BASE OIL (40°C, mm$^2$/s) | 10 | 22 | 32 | 46 | 68 | 143 | 93 | 430 |
| ADDITIVES | EXTREME-PRESSURE AGENT / RUST INHIBITOR / ORGANIC Mo / GREASY AGENT | EXTREME-PRESSURE AGENT / RUST INHIBITOR / ORGANIC Mo / GREASY AGENT | EXTREME-PRESSURE AGENT / RUST INHIBITOR / ORGANIC Mo / GREASY AGENT | EXTREME-PRESSURE AGENT / RUST INHIBITOR / ORGANIC Mo / GREASY AGENT | EXTREME-PRESSURE AGENT / RUST INHIBITOR / ORGANIC Mo / GREASY AGENT | EXTREME-PRESSURE AGENT / RUST INHIBITOR | EXTREME-PRESSURE AGENT | EXTREME-PRESSURE AGENT / GRAPHITE / VISCOSITY IMPROVER |
| CONSISTENCY | 282 | 288 | 281 | 285 | 280 | 281 | 281 | 267 |
| LOAD-BEARING PERFORMANCE | 1960 | 2450 | 2450 | 3090 | 3090 | 1960 | 2450 | >4900 |
| ABRASION RESISTANCE PERFORMANCE | 0.50 | 0.48 | 0.47 | 0.47 | 0.46 | 0.46 | 0.46 | 0.58 |
| COEFFICIENT OF FRICTION | △ | △ | ○ | ○ | △〜○ | △ | △ | × |
| CONFIRMATION OF EFFECT IN ACTUAL MACHINE | △ | △ | ○ | ◎ | ○ | × | × | ×× |

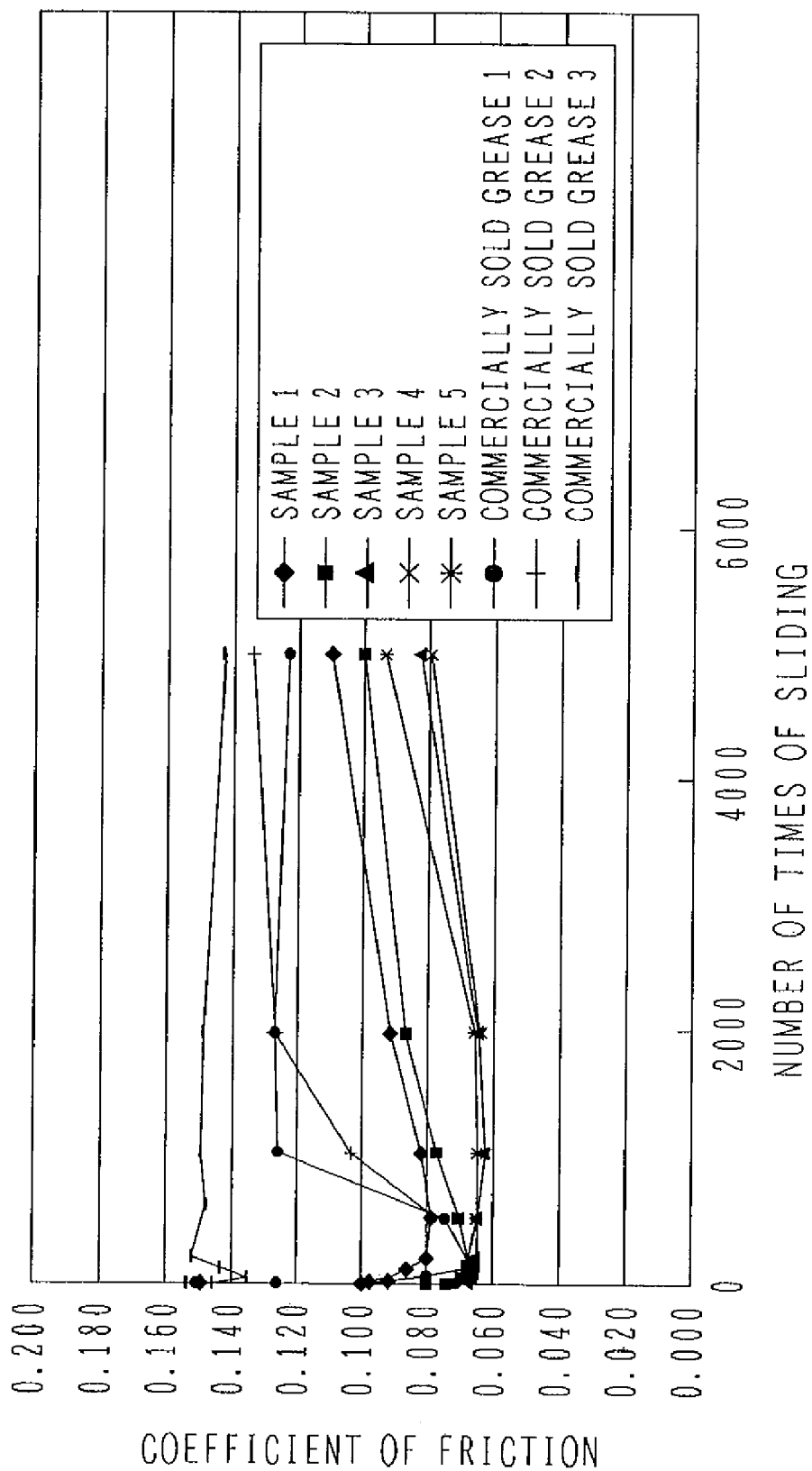

GREASE FOR SLIDE BEARING

CROSS REFERENCE TO RELATED APPLICATIONS

This application is a continuation of U.S. patent application Ser. No. 13/041,993, filed Mar. 7, 2011 (now abandoned), which is a continuation of U.S. patent application Ser. No. 11/587,487, filed Oct. 26, 2006 (now abandoned), which was a U.S. national stage application of PCT/JP05/19623, filed Oct. 25, 2005, the contents of which are hereby incorporated by reference into this application.

BACKGROUND OF THE INVENTION

1. Field of the Invention

The present invention relates to grease for a slide bearing which is formed of a porous sintered alloy-made bushing having pores impregnated with lubricating oil.

2. Description of Related Art

Many of various machines, such as construction machines, civil engineering machines, carrying machines, jacking machines, machine tools, and automobiles, employ slide bearing assemblies each comprising a slide bearing and a shaft which is inserted in the slide bearing and is supported to be slidingly rotatable in the circumferential direction. For example, an excavation mechanism of a hydraulic excavator as a representative of construction machines has a boom coupled to an upper swing body installed on a track body, an arm coupled to a fore end of the boom, and a bucket coupled to a fore end of the arm. At each of articulated portions of the boom, the arm and the bucket, a slide bearing assembly is generally employed which includes a slide bearing for supporting a pivot shaft.

In that type of slide bearing assembly, a bearing is often formed of an oil-impregnated and sintered alloy-made bushing which is obtained by impregnating highly-viscous lubricating oil in a porous bushing made of an iron-base sintered alloy. The oil-impregnated and sintered alloy-made bushing operates such that the impregnated oil swells and reduces its own viscosity due to frictional heat generated when the shaft slides relative to the bushing, whereby the lubricating oil exudes to form a thin oil film on a sliding surface. Therefore, the oil-impregnated and sintered alloy-made bushing exhibits the superior self-lubricating function (see, e.g., Patent Document 1)

Patent Document 1: JP,A 8-105444

BRIEF SUMMARY OF THE INVENTION

For example, when the excavation mechanism of the hydraulic excavator at a standstill is left in a condition where the bucket is held above the ground surface, a moment acts about the shaft of the slide bearing assembly due to the dead load of the excavation mechanism. The excavation mechanism tries to maintain its posture with the aid of holding forces of hydraulic cylinders used for driving the respective articulated portions. In some cases, however, a slip may occur between the shaft and the bearing because pressures in the hydraulic cylinders are lowered with slight leaks of a hydraulic fluid and the force against a downward moment of the excavation mechanism is gradually reduced with the lapse of time.

On that occasion, because two contact surfaces, i.e., the surface of the oil-impregnated and sintered alloy-made bushing and the surface of the counterpart shaft, are generally in an "intimately adapted state", an actual contact area between the shaft and the bearing is much larger than that in the case of using an ordinary iron bushing. With an increase of the contact area between two solid members, an adhesion force acting between the two solid members is also increased and therefore an apparent frictional force acting between the oil-impregnated and sintered alloy-made bushing and the shaft tends to increase in a not-lubricated state (i.e., in a stationary state). As a result, when the oil-impregnated and sintered alloy-made bushing is employed, energy released upon the occurrence of a slip is increased and vibrations generated in the slide bearing assembly are also increased. This results in a fear that, looking at the above-described example, the generated vibrations resonate with other parts of the excavation mechanism, thus causing larger unusual noise correspondingly. Such unusual noise is not related to machine's reliability, but it may give undesired psychological influences and an unpleasant feeling to workers and inhabitants.

SUMMARY OF THE INVENTION

An object of the present invention is to provide grease for a slide bearing, which can suppress unusual noise attributable to a slip caused between a shaft and a bearing when a machine is stopped.

(1) To achieve the above object, the present invention provides slide bearing grease supplied to between a slide bearing formed of a porous sintered alloy-made bushing having pores impregnated with a lubricating material and a shaft inserted in the slide bearing and supported to be slidingly rotatable in the circumferential direction, wherein the slide bearing grease contains base oil having dynamic viscosity of 10-70 $mm^2$/s at 40° C. and exuding under a load of the shaft to form an oil film between the slide bearing and the shaft.

(2) Also, to achieve the above object, the present invention provides slide bearing grease supplied to between a slide bearing formed of a porous sintered alloy-made bushing having pores impregnated with a lubricating material, in which a solid lubricant is mixed, and a shaft inserted in the slide bearing and supported to be slidingly rotatable in the circumferential direction, wherein the slide bearing grease contains base oil having dynamic viscosity of 10-70 $mm^2$/s at 40° C. and exuding under a load of the shaft to form an oil film between the slide bearing and the shaft.

(3) Further, to achieve the above object, the present invention provides slide bearing grease supplied to between a slide bearing formed of a porous sintered alloy-made bushing having pores impregnated with a lubricating material and a shaft inserted in the slide bearing and supported to be slidingly rotatable in the circumferential direction, wherein the slide bearing grease contains base oil having dynamic viscosity lower than that of the lubricating oil and exuding under a load of the shaft to form an oil film between the slide bearing and the shaft.

(4) Still further, to achieve the above object, the present invention provides slide bearing grease supplied to between a slide bearing formed of a porous sintered alloy-made bushing having pores impregnated with lubricating oil and a shaft inserted in the slide bearing and supported to be slidingly rotatable in the circumferential direction, wherein the slide bearing grease contains base oil having dynamic viscosity of 10-70 $mm^2$/s at 40° C. and exuding under a load of the shaft to form an oil film between the slide bearing and the shaft, the slide bearing grease being added with at least a solid lubricant.

(5) Still further, to achieve the above object, the present invention provides slide bearing grease supplied to between a slide bearing formed of a porous sintered alloy-made bushing having pores impregnated with lubricating oil and a shaft inserted in the slide bearing and supported to be slidingly rotatable in the circumferential direction, wherein the slide bearing grease contains base oil having dynamic viscosity lower than that of the lubricating oil and exuding under a load of the shaft to form an oil film between the slide bearing and the shaft, the slide bearing grease being added with at least a solid lubricant.

(6) In above (2), (4) or (5), preferably, the solid lubricant contains at least one selected from among organic molybdenum, molybdenum disulfide, tungsten disulfide, boron nitride, graphite, nylon, polyethylene, polyimide, polyacetal, polytetrafluoroethylene, and polyphenylene sulfide.

(7) In any one of above (1) to (5), preferably, an extreme-pressure agent and a greasy agent are added in the slide bearing grease.

According to the present invention, even when the slide bearing and the shaft are in a relatively stopped state, the oil film is formed between the slide bearing and the shaft by the base oil having a low viscosity and exuding from the slide bearing grease. Since the thus-formed oil film serves as a lubricating film to reduce a frictional force between the slide bearing and the shaft, it is possible to suppress the generation of unusual noise or to reduce the generated unusual noise.

BRIEF DESCRIPTION OF THE DRAWINGS

FIG. 7 is a table showing compositions of the slide bearing grease according to the present invention and commercially sold greases and comparison results of performance tests.

FIG. 8 is a graph showing the results of measuring the coefficients of friction of the slide bearing grease according to the present invention and the commercially sold greases.

Figure 1:
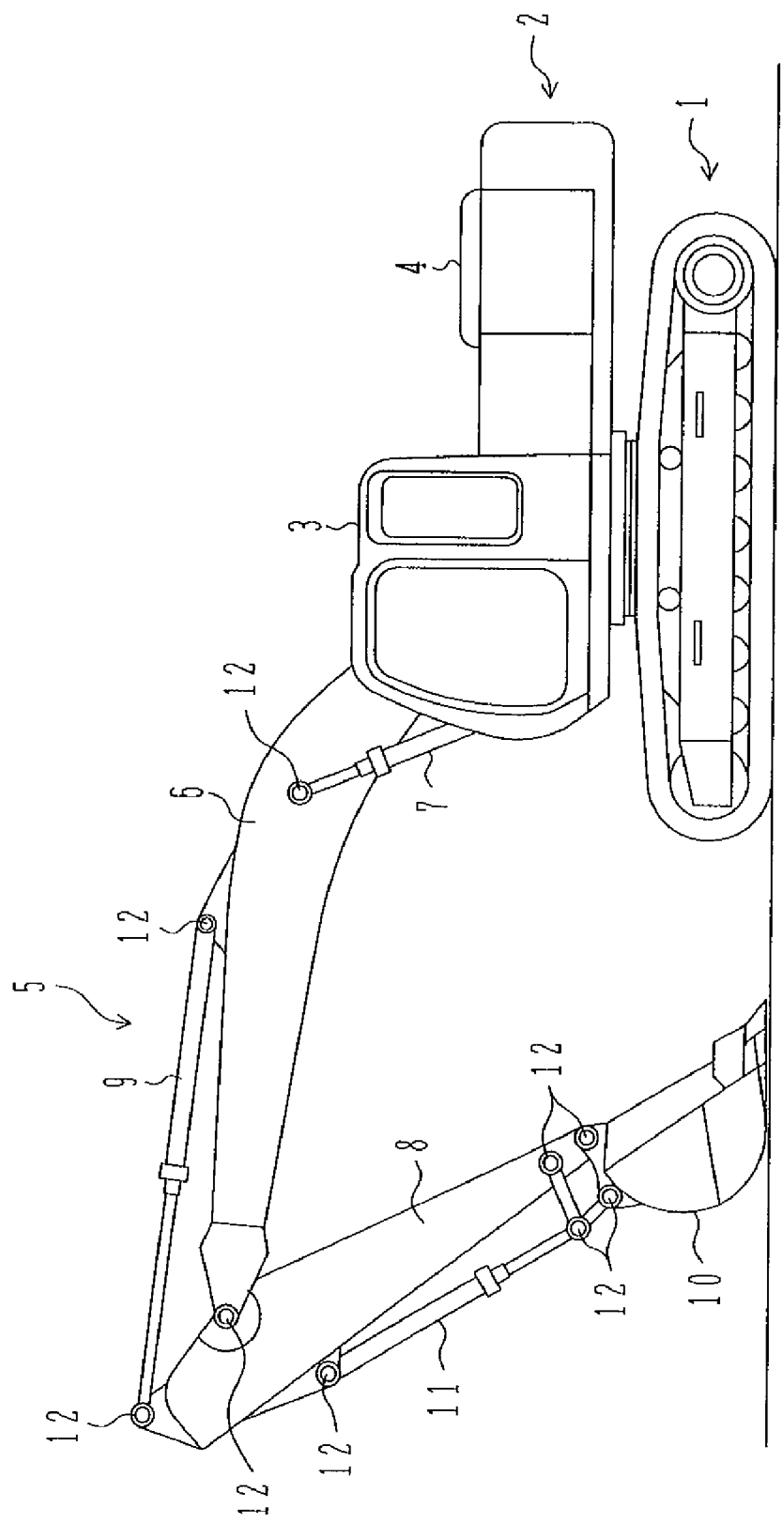
FIG. 1 is a side view showing an overall structure of a hydraulic excavator as one example of machines to which is applied slide bearing grease according to the present invention.

REFERENCE NUMERALS 16 slide bearing
22 shaft
24 grease for slide bearing
30 pore
31 lubricating oil
33 solid lubricant
35 oil film

DETAILED DESCRIPTION OF THE INVENTION

Embodiments of the present invention will be described below with reference to the drawings.

FIG. 1 is a side view showing an overall structure of a hydraulic excavator as one example of machines to which is applied slide bearing grease according to the present invention.

The hydraulic excavator shown in FIG. 1 comprises a lower travel structure 1, an upper swing body 2 installed on the lower travel structure 1 to be able to swing, a cab 3 disposed at one side (left side in FIG. 1) on the upper swing body 2, an engine room 4 disposed at the other side (right side in FIG. 1) on the upper swing body 2, and an excavation mechanism 5 disposed on the upper swing body 2 at the same side as the cab 3.

The excavation mechanism 5 comprises a boom 6 supported by the upper swing body 2 to be able to pivotally move up and down, a boom hydraulic cylinder 7 for pivotally moving the boom 6 up and down, an arm 8 rotatably supported to a fore end of the boom 6, an arm hydraulic cylinder 9 for rotating the arm 8, a bucket 10 rotatably supported to a fore end of the arm 8, and a bucket hydraulic cylinder 11 for rotating the bucket 10.

Those components of the excavation mechanism 5, i.e., the boom 6, the arm 8, the bucket 10, and the associated hydraulic cylinders 7, 9 and 11 are connected to respective counterparts through slide bearing assemblies 12 in a mutually rotatable manner. Although the slide bearing assemblies used in the excavation mechanism 5 differ in fact in size, shape, etc. depending on places where they are mounted, all the slide bearing assemblies have basically the same structure.

Figure 2:
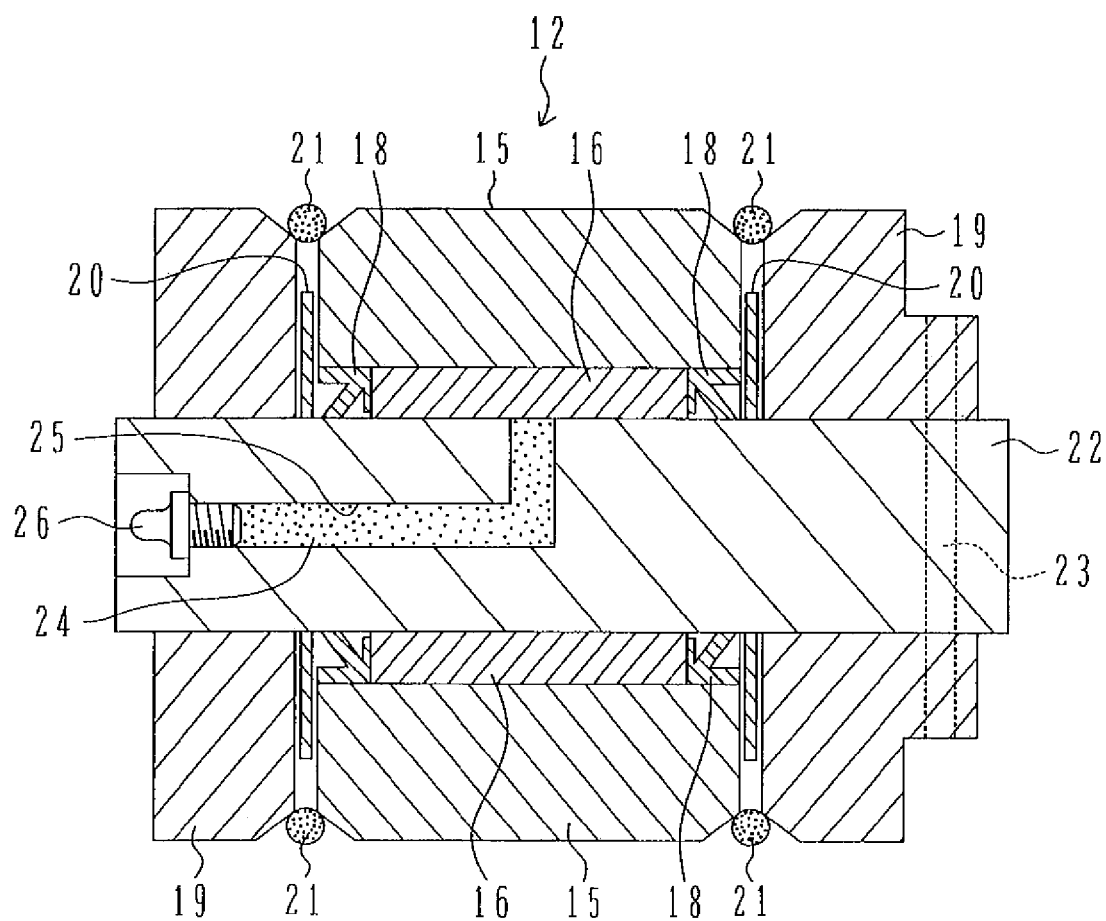
FIG. 2 is a sectional view showing an internal structure of a slide bearing assembly to which is applied slide bearing grease according to a first embodiment of the present invention.

FIG. 2 is a sectional view showing an internal structure of a slide bearing assembly to which is applied slide bearing grease according to a first embodiment of the present invention.

A slide bearing assembly 12 shown in FIG. 2 comprises a boss 15, a slide bearing 16 formed of a porous sintered alloy-made bushing which is fixedly fitted to an inner periphery of the boss 15 by a shrinkage fit, such as a heating or cooling shrinkage fit, and a shaft 22 inserted in and supported by the slide bearing 16 to be slidingly rotatable in the circumferential direction.

Dust seals 18, 18 are disposed on both sides of the slide bearing 16 to face opposite end surfaces of the slide bearing 16 and are press-fitted to the inner periphery of the boss 15. Also, on both sides of the boss 15, brackets 19, 19 are disposed with shims 20, 20 held between opposite end surfaces of the boss 15 and the brackets 19, 19. Gaps between the brackets 19, 19 and the boss 15 are sealed by O-rings 21, 21 fitted at the outer peripheral sides of the gaps. The shaft 22 penetrates through the brackets 19, the shims 20, the dust seals 18 and the slide bearing 16, and is locked to one bracket 19 by a rotation check bolt 23.

A grease supply hole 25 is formed in the shaft 22 to supply slide bearing grease 24 to a substantially central portion of the slide bearing 16 from the side opposed to the side where the rotation check bolt 23 is mounted. A sealing plug 26 is screwed to one end of the grease supply hole 25 so that the slide bearing grease 24 filled in the grease supply hole 25 is sealed off by the sealing plug 26. With such an arrangement, the slide bearing grease 24 filled in the grease supply hole 25 is supplied to between the slide bearing 16 and the shaft 22.

The slide bearing 16 is formed using a porous composite sintered alloy made of copper powder and iron powder, for example, and it has a large number of pores. Highly-viscous lubricating oil is impregnated in the pores such that, when the slide bearing 16 and the shaft 22 are in relative sliding motion, the slide bearing 16 exhibits a sufficient lubrication effect relative to the shaft 22 even when the slide bearing grease 24 is not supplied. The porosity of the slide bearing 16 is preferably in the range of, e.g., about 5-30 [vol %]. If the porosity is less than 5 [vol %], there is a risk that a sufficient amount of lubricating oil is not impregnated and the function as the bearing of the type supplied with no grease becomes insufficient. On the other hand, if the porosity is more than 30 [vol %], the mechanical strength of the slide bearing 16 is reduced. Additionally, any suitable composite sintered alloy made of other materials than copper powder and iron powder can also be used as a material of the slide bearing 16.

Highly-viscous oil having a comparatively high dynamic viscosity is used as the lubricating oil to be impregnated in the slide bearing 16. The lubricating oil swells and reduces its own viscosity due to frictional heat generated when the shaft 22 slides relative to the slide bushing 16, whereby the lubricating oil exudes to a sliding interface between the shaft 22 and the slide bushing 16 and forms a thin oil film. After the use, the lubricating oil shrinks with lowering of temperature and is returned back into the pores of the slide bearing 16 by capillarity. Based on those behaviors of the lubricating oil, the slide bearing 16 exhibits the superior self-lubricating function. The dynamic viscosity of the impregnated lubricating oil is not necessarily limited, but it is required, on an assumption of being impregnated in the slide bearing 16, to fall in such a range that the oil can be held inside the pores in an ordinary state after being impregnated, can exude to the sliding interface during use due to frictional heat generated between the shaft 22 and the slide bearing 16, and thereafter can be returned back to the slide bearing 16 with lowering of temperature. As a practical range of the dynamic viscosity of the lubricating oil, by way of example, it is confirmed that the oil is able to exhibit the above-mentioned behaviors when the dynamic viscosity at 25.5 [° C.], for example, has a value of about 56-1500 [mm$^2$/s]. However, if the dynamic viscosity at 25.5 [° C.], for example, is a value of not higher than 220 [mm$^2$/s], seizure of the slide bearing 16 has been confirmed in some cases when contact pressure is 40 [Mpa] that is lower than standard contact pressure acting on bearings of construction machines, i.e., 70 [Mpa]. In view of such a result, when the present invention is practiced, it is more preferable to employ lubricating oil having a value of the dynamic viscosity at 25.5 [° C.] in the range of about 220-1500 [mm$^2$/s].

As the lubricating oil impregnated in the slide bearing 16, most of various lubricating oils generally commercially available, including mineral oil, synthetic oil, etc., can be used and the composition of the lubricating oil is not limited to particular one so long as the oil has the dynamic viscosity capable of exhibiting the above-mentioned behaviors. Note that grease containing a fibrous thickener or the like is excluded from the selection target because such grease cannot be impregnated in the slide bearing 16.

Further, in this embodiment, a solid lubricant is contained in the lubricating oil impregnated in the slide bearing 16. The solid lubricant contained in the lubricating oil has a layered structure and exhibits a superior lubrication effect with sliding of individual layers in the layer extending direction. The solid lubricant includes at least one selected from among, for example, organic molybdenum, molybdenum disulfide, tungsten disulfide, boron nitride, graphite, nylon, polyethylene, polyimide, polyacetal, polytetrafluoroethylene, and polyphenylene sulfide. The content of the solid lubricant in the lubricating oil is in the range of, e.g., about 2.0-[% by weight], and the particle size of solid lubricating fine particles is selected to be sufficiently small (e.g., about 0.1 μm-100 μm) such that the fine particles are able to freely move out of and into the pores of the slide bearing 16 without being clogged in the pores.

The lubricating oil containing the solid lubricant is impregnated in the slide bearing 16 through the steps of sufficiently agitating the solid lubricant in the form of fine particles and the lubricating oil to uniformly disperse the solid lubricant in the lubricating oil, and then heating the lubricating oil so as to reduce the oil viscosity for liquefaction. The slide bearing 16 is immersed in the liquefied lubricating oil and is left to stand in a vacuum atmosphere. As a result, air in the pores of the slide bearing 16 is sucked out, and the lubricating oil containing the solid lubricant is sucked into the pores. After impregnating the lubricating oil in the pores in such a manner, the slide bearing 16 is taken out into air and is naturally cooled to room temperature, whereby the lubricating oil restores the original viscosity again and loses fluidity while residing in the pores of the slide bearing 16. Thus, the lubricating oil containing the solid lubricant is impregnated and held in the pores of the slide bearing 16.

The heating temperature of the lubricating oil when the lubricating oil is impregnated in the slide bearing 16 is not limited to a particular value, but the heating temperature is changed depending on the viscosity of the lubricating oil used. In other words, it is just required that the lubricating oil be heated to temperature enough for liquefaction of the lubricating oil. However, when resin-base materials, such as polyethylene, polyimide, polyacetal, and PTFE (polytetrafluoroethylene), are used as the solid lubricant, the heating temperature has to be set lower than the heat-resistant temperature of the resin used. Also, the immersion time and the vacuum pressure during and under which the slide bearing 16 is immersed in the lubricating oil are not limited to particular values, but they are set depending on the viscosity of the lubricating oil used. In other words, it is just required that the slide bearing 16 is impregnated until the pores of the slide bearing 16 are saturated with the lubricating oil. Assuming, for example, that lubricating oil having the dynamic viscosity of 460 [mm$^2$/s] is heated to temperature of 60-80 [° C.] and the slide bearing 16 is immersed in the heated lubricating oil under a vacuum of $2 \times 10^{-2}$ [mmHg], the pores of the slide bearing 16 are usually saturated with the lubricating oil in about 1 hour.

The shaft 22 is made of a steel material or the like. Preferably, after performing treatment, such as carburizing, high-frequency induction quenching, laser quenching, or nitriding, on a shaft surface (outer peripheral surface), the shaft surface is subjected to surface reforming treatment by transformation (to, e.g., zinc phosphate or manganese phosphate) or sulphurizing. By thus performing the surface reforming treatment of the shaft 22 with the use of an extreme-pressure applying material, such as Zn (zinc), Mn (manganese) and S (sulfur), "wetness" between the shaft and the lubricating oil impregnated in the slide bearing 16 is improved, whereby the lubrication effect and tribology characteristics are enhanced. From a similar point of view, it is more preferable that, like the surface of the shaft 22, the sliding surface (inner peripheral surface) of the slide bearing 16 coming into contact with the shaft 22 is also subjected to the surface reforming treatment, such as carburizing, quenching, nitriding, or sulphurizing. Abrasion resistance of the slide bearing 16 is further increased by forming a carburizing-hardened layer with a thickness of about 1 [mm]-3 [mm], preferably 2 [mm], on the sliding surface of the slide bearing 16 in contact with the shaft 22.

Figure 3:
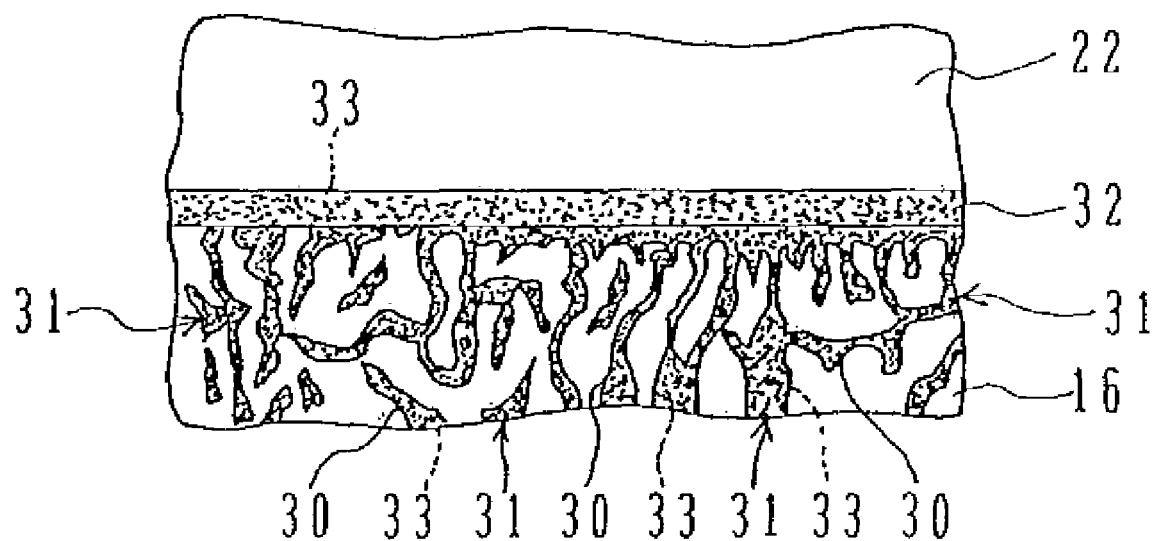
FIG. 3 is a partial sectional view illustratively showing, in enlarged scale, the proximity of an interface between a slide bearing and a shaft to which is applied the slide bearing grease according to the first embodiment of the present invention.

FIG. 3 is a partial sectional view illustratively showing, in enlarged scale, the proximity of the interface between the slide bearing and the shaft to which is applied the slide bearing grease according to the first embodiment of the present invention.

As shown in FIG. 3, when the slide bearing 16 and the shaft 22 slide relative to each other, highly-viscous lubricating oil 31 impregnated in pores 30 of the slide bearing 16 is caused to exude onto the inner peripheral surface of the slide bearing 16 together with a solid lubricant 33 in the form of fine particles due to frictional heat generated by the relative sliding, thereby forming a thin oil film 32. Because the oil film 32 formed by the lubricating oil 31 containing the solid lubricant 33 serves as a sliding interface between the slide bearing 16 and the shaft 22, fine layers of the solid lubricant 33 slide in the layer extending direction, thus resulting in an excellent lubrication effect and superior tribology characteristics. The lubricating oil 31 impregnated in the pores 30 has very low fluidity and is therefore hardly lost even when the relative sliding of the slide bearing 16 and the shaft 22 is repeated. As a result, the oil film 32 can be continuously supplied with stability for a very long term. The so-called "scoring phenomenon" occurred between the shaft 22 and the slide bearing 16, which are angularly movable relative to each other, is caused by microscopic metal contact between them. However, that phenomenon is prevented by the presence of a microscopic "oil pool" (i.e., the oil film 32) shown in FIG. 3.

Returning to FIG. 2, the above-described slide bearing grease 24 in the grease supply hole 25 is made of base oil having lower dynamic viscosity than the lubricating oil 31, more particularly base oil that has the dynamic viscosity of 10-70 [mm$^2$/s] (preferably 30-70 [mm$^2$/s]) at 40 [° C.] and is capable of exuding due to the load of the shaft 22 to form an oil film (described later) between the slide bearing 16 and the shaft 22. Such base oil is obtained as low-viscous base oil of hydrocarbon-base synthetic oil, low-viscous mineral oil, or the like. The slide bearing grease 24 is prepared by adding, to the low-viscous base oil, not only at least one selected from among metallic soap, polyurea resin, organic bentonite, silica, and a fluorine-contained resin as a thickner compatible with the base oil, but also an antioxidant, an extreme-pressure agent, a greasy agent serving as a lubrication aid, or a viscosity improver, if necessary. Furthermore, the solid lubricant contained in the lubricating oil impregnated in the slide bearing 16 may also be added to the slide bearing grease 24.

By selecting the base oil having the dynamic viscosity of 10-70 [mm$^2$/s] at 40 [° C.], the slide bearing grease 24 having the above-described composition exhibits the functions of ensuring lubrication between the slide bearing 16 and the shaft 22 during a certain time or longer in which the relative sliding between them is stopped. The grounds why the dynamic viscosity of the base oil used in the slide bearing grease 24 should be limited to the above range will be described later.

A description is now made of the operation and action of the slide bearing assembly to which is applied the grease according to the first embodiment of the present invention.

As described above with reference to FIG. 3, when the slide bearing 16 and the shaft 22 slide relative to each other, the lubricating oil 31 impregnated in the pores 30 of the slide bearing 16 is caused to exude onto the inner peripheral surface of the slide bearing 16 together with the solid lubricant 33, thereby forming the thin oil film 32. Stated another way, because the solid lubricant 33 enters the sliding interface between the slide bearing 16 and the shaft 22 along with the lubricating oil 31, the thin oil film 32 made of the lubricating oil 31 and the solid lubricant 33 is formed at the sliding interface between the slide bearing 16 and the shaft 22, and an excellent lubrication effect is obtained between the slide bearing 16 and the shaft 22, which are slidingly movable relative to each other, regardless of the sliding speed.

Figure 4:
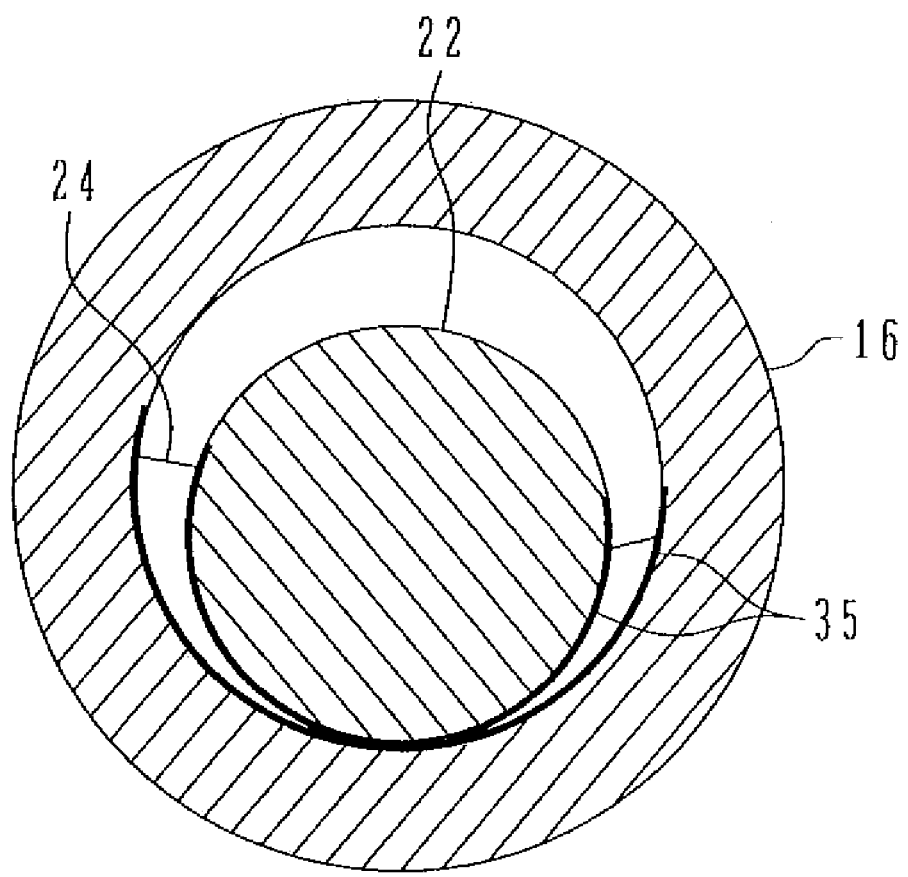
FIG. 4 is a sectional view of the slide bearing and the shaft, the view illustratively showing a state of an oil film exuding from the slide bearing grease according to the present invention.

On the other hand, when the relative sliding of the slide bearing 16 and the shaft 22 is stopped with, e.g., cease of the machine's operation, the lubricating oil 31 forming the oil film 32 at the sliding interface is sucked into the numerous pores 30 of the slide bearing 16 together with the solid lubricant 33 by capillarity with lowering of temperature. On that occasion, the lubricating oil 31 is returned back into the slide bearing 16, thus resulting in a condition where the lubricating oil 31 hardly exudes to between the slide bearing 16 and the shaft 22. As shown in FIG. 4, however, the low-viscous base oil exuding from the slide bearing grease 24 due to the load of the shaft 22 forms an oil film 35 between the slide bearing 16 and the shaft 22. This is because the base oil of the slide bearing grease 24 has a low dynamic viscosity of 10-70 [mm$^2$/s] and has superior "wetness". FIG. 4 is a sectional view of the slide bearing 16 and the shaft 22, the view illustratively showing a state of the oil film 35.

In general, since grease used in slide bearings of construction machines is usually prepared such that base oils has viscosity set to a comparatively high value for the purpose of increasing the lubrication effect under high contact pressure, a lubrication film formed between the slide bearing and the shaft is lost while the construction machine is stopped.

Figure 5:
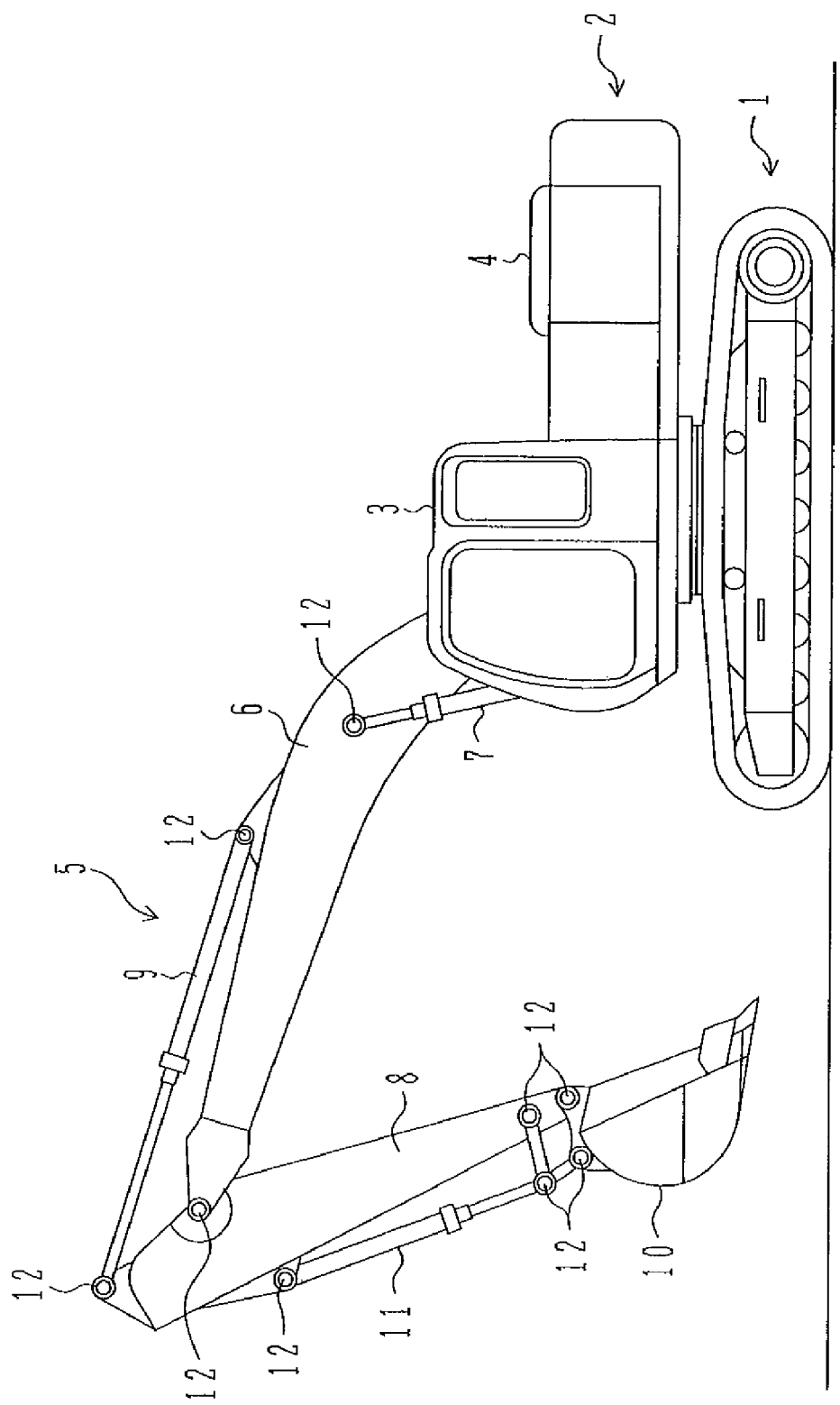
FIG. 5 is a side view showing an overall structure of the hydraulic excavator as one example of machines to which is applied the slide bearing grease according to the present invention, the view showing a condition where a bucket is floated above the ground surface.

Here, when the hydraulic excavator is stopped longer than a certain time, it is generally brought into such a posture that the bucket 10 of the excavation mechanism 5 is contacted with the ground as shown in FIG. 1. However, if the bucket 10 is left in a state of being floated above the ground surface as shown in FIG. 5, a moment attributable to the dead load of the excavation mechanism 5 acts on the slide bearing assembly 12. Although the excavation mechanism 5 tries to maintain its current posture with the aid of holding forces given by a hydraulic fluid supplied to the hydraulic cylinders 7, 9 and 11, the force against a downward moment of the excavation mechanism 5 is gradually reduced with the lapse of time if pressures in the hydraulic cylinders are lowered with slight leaks of the hydraulic fluid in a hydraulic drive system. Consequently, in spite of the hydraulic excavator being in the completely stopped state, there generates a force acting to slide the slide bearing 16 and the shaft 22 relative to each other.

In this connection, assuming the case of not supplying the slide bearing grease 24, the oil film is hardly present between the slide bearing 16 and the shaft 22 when those two members are held in a relatively stationary state for a period longer than the certain time. Because the contact surface of the slide bearing 16, i.e., the oil-impregnated and sintered alloy-made bushing, and the contact surface of the shaft 22 are in a smooth state containing less unevenness, which is called an "intimately adapted state", an actual contact area between the slide bearing and the shaft is much larger than that in the case of a bearing assembly using a simple iron bushing. In general, with an increase of the actual contact area between two solid members, an adhesion force acting between the two solid members is also increased. In other words, when the two solid members start relative sliding again, energy required to shear the adhered portion between the two solid members is increased and an apparent frictional force is also increased correspondingly.

Accordingly, when the moment acting on the slide bearing assembly 12 exceeds the maximum static frictional force acting between the slide bearing 16 and the shaft 22, the energy accumulated so far is released at a stroke and the two members slide relative to each other by a predetermined distance. If vibrations generated in the slide bearing 16 due to a fretting phenomenon, which is caused as described above, resonate with the excavation mechanism 5, large unusual noise may occur unexpectedly. Such unusual noise attributable to the fretting phenomenon is repeated until the bucket 10 reached the ground surface.

In contrast, according to this embodiment, even when the slide bearing 16 and the shaft 22 are in the relatively stopped state, the oil film 35 is formed between the slide bearing 16 and the shaft 22 by the low-viscous base oil having superior "wetness" and exuding from the slide bearing grease 24 as described above with reference to FIG. 4. The thus-formed oil film 35 serves as a lubricating film to reduce the frictional force between the slide bearing 16 and the shaft 22, thereby suppressing the generation of unusual noise or reducing the generated unusual noise.

Figure 6:
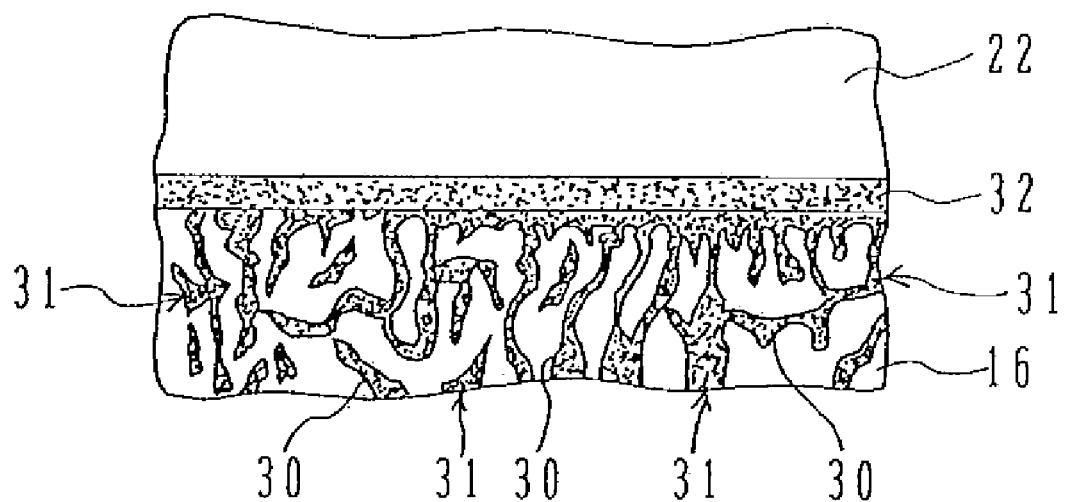
FIG. 6 is a partial sectional view illustratively showing, in enlarged scale, the proximity of the interface between the slide bearing and the shaft to which is applied slide bearing grease according to a second embodiment of the present invention.

FIG. 6 is a partial sectional view illustratively showing, in enlarged scale, the proximity of the interface between the slide bearing and the shaft to which is applied slide bearing grease according to a second embodiment of the present invention. Similar components in FIG. 6 to those shown in the above-described drawings are denoted by the same numerals as those in the above description and they are not described here.

The slide bearing 16 in this second embodiment is also formed of a porous sintered alloy-made bushing as in the foregoing embodiment, but highly-viscous lubricating oil containing no solid lubricant is impregnated in the pores of the slide bearing 16. In this second embodiment, the lubricating oil can be impregnated in the slide bearing 16 in the same manner as in the foregoing embodiment by replacing the lubricating oil containing the solid lubricant in the foregoing embodiment with the lubricating oil containing no solid lubricant in this second embodiment.

In this second embodiment, as shown in FIG. 6, when the slide bearing 16 and the shaft 22 slide relative to each other, highly-viscous lubricating oil 31 impregnated in pores 30 of the slide bearing 16 is caused to exude onto the inner peripheral surface of the slide bearing 16 due to frictional heat generated by the relative sliding, thereby forming a thin oil film 32. Because the oil film 32 serves as a sliding interface between the slide bearing 16 and the shaft 22, an excellent lubrication effect is developed and superior tribology characteristics are obtained. The lubricating oil 31 impregnated in the pores 30 has very low fluidity and is therefore hardly lost even when the relative sliding of the slide bearing 16 and the shaft 22 is repeated. As a result, the oil film 32 can be continuously supplied with stability for a very long term. The so-called "scoring phenomenon" occurred between the shaft 22 and the slide bearing 16, which are angularly movable relative to each other, is caused by microscopic metal contact between them. However, that phenomenon is prevented by the presence of a microscopic "oil pool" (i.e., the oil film 32) shown in FIG. 6.

Further, in this second embodiment, the slide bearing grease 24 filled in the grease supply hole 25 (see FIG. 2) is prepared by adding a solid lubricant similar to that used in the first embodiment to base oil similar to that used in the first embodiment. Stated another way, while the lubricating oil 31 impregnated in the slide bearing 16 contains the solid lubricant in the first embodiment, the slide bearing grease 24 filled in the grease supply hole 25 contains the solid lubricant in this second embodiment.

By employing the base oil having the dynamic viscosity of 10-70 [mm$^2$/s] at 40 [° C.], the slide bearing grease 24 in this second embodiment, which has the above-described composition, ensures lubrication between the slide bearing 16 and the shaft 22 during a certain time or longer in which the relative sliding between them is stopped. Moreover, addition of the solid lubricant develops the function of ensuring lubrication between the slide bearing 16 and the shaft 22 when they undergo fine pivotal motion.

Also in this second embodiment, when the slide bearing 16 and the shaft 22 slide relative to each other, the lubricating oil 31 impregnated in the pores 30 of the slide bearing 16 is caused to exude onto the inner peripheral surface of the slide bearing 16, thereby forming the thin oil film 32. On that occasion, because the slide bearing grease 24 filled in the grease supply hole 25 is supplied to the interface between the slide bearing 16 and the shaft 22, the solid lubricant being in the form of fine particles and mixed in the slide bearing grease 24 enter between the slide bearing 16 and the shaft 22. Thus, the solid lubricant enters the sliding interface between the slide bearing 16 and the shaft 22 together with the lubricating oil 31, whereby fine layers made up of the lubricating oil 31 and the slide bearing grease 24 containing the solid lubricant are formed between the slide bearing 16 and the shaft 22 so as to develop an excellent lubrication effect between the slide bearing 16 and the shaft 22 which are slidingly movable relative to each other.

The other construction and operation of this second embodiment are the same as those in the first embodiment and, the second embodiment can also provide similar advantages to those obtained with the first embodiment.

In the operation accompanying with fine pivotal motion or extremely low-speed sliding in which the slide bearing 16 and the shaft 22 slide just slightly, contact pressure is produced at a level higher than that in the stopped state, and the oil film 35 formed by only the base oil of the slide bearing grease 24 can not provide a film thickness enough for lubrication of the sliding. Furthermore, because the frictional heat generated in such a situation is very small, the lubricating oil 31 does not exude in sufficient amount sometimes. This results in a risk of producing local contact pressure that may cause local abrasion or damage, such as "scoring", on the surface of the shaft 22 or the inner peripheral surface of the slide bearing 16, and may give rise to incidental unusual noise.

In contrast, according to this embodiment, because the solid lubricant contained in the slide bearing grease 24 promptly enters between the slide bearing 16 and the shaft 22, a sufficient lubrication effect can be ensured even when the excavation mechanism 5 is driven at a comparatively low speed. As a matter of course, when the excavation mechanism is driven at a higher speed, the frictional heat is generated in sufficient mount, whereby the lubricating oil 31 exudes in necessary and sufficient amount and the superior lubrication effect specific to the oil-impregnated and sintered alloy-made bushing is developed.

In spite of the slide bearing 16 and the shaft 22 being apparently stationary relative to each other, when an engine is driven, engine vibrations are transmitted to the slide bearing assembly 12 and high contact pressure is momentarily generated between the slide bearing 16 and the shaft 22. Further, looking from a microscopic point of view, a slip occurs, though slightly, between the slide bearing 16 and the shaft 22. Thus, even with the excavation mechanism 5 itself being not operated, when the engine is driven, the slide bearing 16 and the shaft 22 are not in the relatively stationary state, and the above-described adhesion force is hardly generated. Therefore, when the fine pivotal motion of the excavation mechanism 5 is started from the engine driven state, the fretting phenomenon is hard to occur. Also, in such a case, the sliding operation of the slide bearing assembly 12 is lubricated additionally with the action of the solid lubricant contained in the slide bearing 16. Even if the fretting phenomenon occurs, the above-described adhesion force is small and the generated unusual noise is so small as to be almost inaudible.

FIG. 7 is a table showing compositions of the slide bearing grease according to the present invention and commercially sold greases and comparison results of performance tests.

The inventors have studied the mechanism of generation of the fretting phenomenon and the relationship between that mechanism and the kinds of greases, and have made the performance tests. Based on the test results, the range of the dynamic viscosity of the base oil used in the slide bearing grease according to the present invention is limited to the range described above.

In the tests, samples 1-5 of the slide bearing grease according to the present invention were prepared through the steps of producing base grease in the same manner as that generally used in producing lithium grease, mixing additives in the produced grease, kneading the mixture by using a 3-roll mill, and adjusting the consistency of the mixture to NLGI (National Lubricating Grease Institute) No. 2 grade (consistency: 265-295). The performances of the samples 1-5 were compared with those of commercially sold greases 1-3.

Any of the samples 1-5 contained mineral oil as the base oil, Li as a thickener, and an extreme-pressure agent, a rust inhibitor, an organic Mo (solid lubricant), and a greasy agent were as additives. However, the base oils used in the samples 1-5 differed in dynamic viscosity from one another, and the dynamic viscosities of the base oils used in the samples 1-5 at 40 [° C.] had values [$mm^2/s$] of 10, 22, 32, 46 and 68, respectively.

On the other hand, the commercially sold greases 1 and 2 tested for comparison were ones very commonly supplied to the slide bearing assembly in the excavation mechanism of the hydraulic excavator shown in FIG. 1. The commercially sold grease 3 was one in which base oil had higher viscosity to increase the extreme-pressure performance. While the consistency of each of the commercially sold greases 1-3 was set to NLGI No. 2 grade, the dynamic viscosities of the base oils (mineral oils) used in the commercially sold greases 1-3 had values [$mm^2/s$] of 143, 93 and 430, respectively.

The samples 1-5 and the commercially sold greases 1-3, prepared as described above, were tested for load-bearing performance and abrasion resistance performance. As a result of the tests, any of the samples 1-5 showed a value comparable to those of the commercially sold greases 1 and 2 in the abrasion resistance performance, and showed a value comparable to or better than those of the commercially sold greases 1 and 2 in the load-bearing performance. In particular, the samples 4 and 5 showed a high value of 3090 [N] in the load-bearing performance. The load-bearing performance test was conducted in accordance with a high-speed 4-ball test (1770 [rpm]×10 [sec]), and the abrasion resistance performance test was conducted in accordance with a high-speed 4-ball test (1220 [rpm]×40 [kgf]×75 [° C.]×1 [hr]).

Also, the samples 1-5 and the commercially sold greases 1-3 were evaluated for the coefficient of friction. The coefficient of friction was evaluated by a method of preparing a disk made of an oil-impregnated alloy and having a diameter of 60 [mm] and a pin having dimensions of φ 4 [mm]×6 [mm] (disk contact surface: R=2 [mm]) with its surface subjected to high-frequency induction quenching, and then determining changes in the coefficient of friction measured when the pin was moved to reciprocally slide on the disk with each kind of grease interposed between them. Test conditions were set to the sliding speed: 180 [mm/min], the sliding width: 10 [mm], the pressing load of the pin against the disk: 1 [kg], and the grease film thickness: 0.2 [mm]. The coefficient of friction at a certain point in time (corresponding to 5000 reciprocal sliding motions) was measured after the lapse of a predetermined time from the start of the sliding. FIG. 8 is a graph showing the measured results.

Based on the graph of FIG. 8, the inventors evaluated the coefficient of friction in three grades as follows. The grease having the coefficient of friction being constantly low with stability was evaluated as "⊙", the grease having the coefficient of friction being low at the beginning, but increasing from in intermediate point in time was evaluated as "Δ", and the grease having the coefficient of friction being constantly high was evaluated as "x". As a result, the commercially sold grease 3 in which the base oil had a very high viscosity was evaluated as "x", and the samples 1, 2 and the commercially sold grease 1, 2 were evaluated as "Δ". The sample 5 was evaluated as "Δ–○", and the samples 3, 4 were evaluated as "○".

The effect in an actual machine was confirmed by a method of supplying each of the samples 1-5 and the commercially sold greases 1-3 to the slide bearing assemblies in the excavation mechanism of the hydraulic excavator, stopping the bucket 10 in a state floated (e.g., about 1 [mm]) above the ground surface as shown in FIG. 5, and measuring how many times unusual noise generated due to slips in the slide bearing assemblies 12 between the boom 6 and the arm 8 and between the arm 8 and the bucket 10 for 30 minutes. In such tests, a weight of about 1 t was attached to the bucket 10 in order to make a larger moment acting on the slide bearing assemblies 12.

As a result of conducting the tests as described above, the inventors evaluated the case generating unusual noise in number of times of not larger than 30 (not larger than 1 in average/minute) to be "⊙", the case generating unusual noise in number of times of not larger than 60 (not larger than 2 in average/minute) to be "○", the case generating unusual noise in number of times of not larger than 90 (not larger than 3 in average/minute) to be "Δ", the case generating unusual noise in number of times of not larger than 120 (not larger than 4 in average/minute) to be "x", and the case generating unusual noise in number of times of larger than 120 (larger than 4 in average/minute) to be "xx". As seen from the results, any of the commercially sold greases 1-3 was evaluated as "X" or inferior. In particular, the commercially sold grease 3 in which the base oil had a very high dynamic viscosity showed the test result inferior to those of the commercially sold greases 1 and 2. On the other hand, when the samples 1-5 were used, the number of times of unusual noise generated was apparently reduced from that when the commercially sold greases 1-3 were used.

From the results of the above performance tests, it was found that, by using the grease containing the base oil with the dynamic viscosity being not higher than 70 [$mm^2/s$] at 40 [° C.], the occurrence of unusual noise can be suppressed in comparison with the case of using the commercially sold greases. Meanwhile, oil having the dynamic viscosity of lower than 10 [$mm^2/s$] at 40 [° C.] is special and not general. Although being present as a part of synthetic oils, such special oil is hardly known in mineral oils and is not adequate as the base oil of the grease because of having a low ignition point. For that reason, a lower limit value of the base oil viscosity is just required to be set to 10 [mm²/s]. Thus, it has been found that the occurrence of unusual noise can be suppressed by using the grease containing the base oil with the dynamic viscosity of 10-70 [mm²/s] at 40 [° C.]. In particular, a satisfactory effect of suppressing the unusual noise is confirmed for the samples 3-5. Therefore, the grease containing the base oil with the dynamic viscosity of 30-70 [mm²/s] at 40 [° C.] is especially preferable from the viewpoint of obtaining the satisfactory effect of suppressing the unusual noise.

In the above-described performance tests, the various kinds of greases were supplied to the slide bearing assemblies from the beginning. Additionally, another test was performed, by holding the slide bearing assemblies in a solid lubricated state in an initial stage, to determine whether the unusual noise could be suppressed when the greases were supplied after the occurrence of the unusual noise. As a result, it was confirmed that while no effect was found with the supply of the commercially sold greases, the occurrence of the unusual noise was promptly suppressed when the samples of the grease according to the present invention were supplied.

The present invention is intended to limit the dynamic viscosity of the base oil exuding from the grease, whereas the viscosity of the grease itself is not limited to particular one. Accordingly, the grease according to the present invention may be prepared in the form of a paste with adjustment of composition and coated by using, e.g., a spatula or poured through, e.g., a tube. As an alternative, the grease may be diluted with a solvent and sprayed by using, e.g., a spray.

While the first embodiment has been described in connection with the oil-impregnated and sintered alloy-made bushing in which the lubricating oil to be impregnated contains the solid lubricant, as one application example of the slide bearing grease according to the first embodiment, the slide bearing grease according to the first embodiment can also be applied to the oil-impregnated and sintered alloy-made bushing in which lubricating oil containing no solid lubricant is impregnated.

Further, while the above description has been made in connection with the case where the grease according to the present invention is applied to slide bearings disposed in the articulated portions of the excavation mechanism in the hydraulic excavator, the present invention can also be applied to similar articulated portions in other various machines, such as construction machines, civil engineering machines, carrying machines, jacking machines, machine tools, and automobiles.

The invention claimed is:

1. A slide bearing assembly comprising:
a slide bearing that is part of an excavator with front end attachments having joints, said slide bearing being formed of a porous sintered alloy-made bushing having pores;
a shaft inserted in said slide bearing and supported to be slidingly rotatable in a circumferential direction;
a lubricating oil impregnated in said pores of the bushing, wherein the lubricating oil exudes from said pores while the slide bearing slides relative to the shaft and lubricates the interface between the slide bearing and the shaft;
a slide bearing grease supplied between the slide bearing and the shaft;
wherein the slide bearing grease contains a base oil having a dynamic viscosity lower than that of said lubricating oil, and
while the relative sliding between the slide bearing and the shaft is maintained in a stationary state, the base oil of the slide bearing grease exudes under a load of said shaft to form an oil film between said slide bearing and said shaft.

2. The slide bearing assembly according to claim 1, wherein the relative sliding between the slide bearing and the shaft occurs in a high load, low speed operation.

3. The slide bearing assembly according to claim 1, wherein the slide bearing is in one of a connection between a boom and an upper body, an arm to the boom and a work implement to the arm of an excavator.

4. The slide bearing assembly according to claim 1, wherein the slide bearing has a distributed load across the bearing surface and is under high contact pressure in the stationary state.

5. The slide bearing assembly according to claim 1, wherein the base oil has a dynamic viscosity of 10-70 mm²/s at 40° C.

6. The slide bearing assembly according to claim 5, wherein the lubricating oil has a dynamic viscosity of 220-1500 mm²/s at 25.5° C.

7. A slide bearing assembly comprising:
a slide bearing installed in joints of a front end attachment of an excavator and formed of a porous sintered alloy-made bushing having pores;
a shaft inserted in said slide bearing and supported to be slidingly rotatable in a circumferential direction;
a lubricating oil impregnated in said pores of the bushing, the lubricating oil exuding onto the sliding surface between the slide bearing and the shaft and lubricating between the slide bearing and the shaft, when the slide bearing and the shaft slide relative to each other; and
slide bearing grease supplied between the slide bearing and the shaft;
the slide bearing grease having at least a solid lubricant and containing a base oil having a dynamic viscosity lower than that of said lubricating oil, and
the base oil exuding under a load of said shaft and forming an oil film between said slide bearing and said shaft while the relative sliding between the slide bearing and the shaft is maintained in a stationary state.

8. The slide bearing assembly according to claim 7, wherein the relative sliding between the slide bearing and the shaft occurs in a high load, low speed operation.

9. The slide bearing assembly according to claim 7, wherein the slide bearing is in one of a connection between a boom and an upper body, an arm to the boom and a work implement to the arm of an excavator.

10. The slide bearing assembly according to claim 7, wherein the slide bearing has a distributed load across the bearing surface and is under high contact pressure in the stationary state.

* * * * *